United States Patent [19]

Murphy

[11] 4,126,722

[45] Nov. 21, 1978

[54] FUSING SURFACE

[75] Inventor: Richard J. Murphy, Norwood, Mass.

[73] Assignee: Xerox Corporation, Stamford, Conn.

[21] Appl. No.: 733,686

[22] Filed: Oct. 18, 1976

Related U.S. Application Data

[62] Division of Ser. No. 497,411, Aug. 14, 1976, Pat. No. 4,000,339.

[51] Int. Cl.[2] ...................... B32B 25/20; G03G 15/20

[52] U.S. Cl. ...................................... 428/339; 29/132; 118/60; 427/22; 427/226; 427/227; 427/387; 428/409; 428/447; 428/450; 428/913; 428/334

[58] Field of Search ............... 428/447, 450, 339, 409, 428/913, 334; 29/132; 427/22, 387, 226, 227, 194, 195; 118/60; 260/46.5 G

[56] References Cited

U.S. PATENT DOCUMENTS

| | | | |
|---|---|---|---|
| 3,448,076 | 6/1969 | Bluestein | 260/46.5 G |
| 3,457,221 | 7/1969 | Stengle | 428/447 X |
| 3,527,659 | 9/1970 | Keil | 428/447 |
| 3,669,707 | 6/1972 | Donnelly et al. | 29/132 X |
| 3,731,358 | 5/1973 | Artl | 29/132 |

OTHER PUBLICATIONS

*Rubber Chemistry and Technology*, 40, p. 629, (1967), D. K. Thomas.

*Primary Examiner*—Michael F. Esposito
*Assistant Examiner*—Stuart D. Frenkel
*Attorney, Agent, or Firm*—James J. Ralabate; Ernest F. Chapman

[57] ABSTRACT

A silicone rubber surface for fixing resinous powder images to a substrate at elevated temperatures in a xerographic reproducing apparatus is disclosed. The silicone rubber surface prevents offset of the image by supplying inherently a release material to the surface. Dispersed in the silicone rubber is a catalytic agent which in the presence of water or moisture, promotes the degradation of the silicone rubber over a period of time at elevated temperatures. The release material is the degradation product of the silicone rubber, and release is possible throughout the lifetime of the fuser surface without the external application of release materials.

17 Claims, No Drawings

FUSING SURFACE

This is a division of application Ser. No. 497,411, filed Aug. 14, 1974, now U.S. Pat. No. 4,000,339.

BACKGROUND OF THE INVENTION

This invention relates generally to heat fusing methods and devices, and more particularly, to an improved fusing surface and method which will prevent offsetting of a resin-based powder onto the surface during the fusing operation. As used herein, the fusing surface may be a roll, a flat surface or any other shape suitable for fixing toner or resin-based powder images. The invention is particularly useful in the field of xerography where images are electrostatically formed and developed with resinous powders known as toners, and thereafter fused or fixed onto sheets of paper or other substrates to which the powder images have been transferred. The resin-based powders or toners of this invention are heat softenable, such as those provided by toners which contain thermoplastic resins and used conventionally in a variety of commercially known methods.

In order to fuse images formed of the resinous powders or toners, it is necessary to heat the powder and the substrate to which it is to be fused to a relatively high temperature, generally in excess of about 200° F. This will vary depending upon the softening range of the particular resin used in the toner. Generally, even higher temperatures are contemplated such as approximately 325° F., or higher. It is undesirable, however, to raise the temperature of the substrate substantially higher than 400° F., because of the tendency of the substrate to discolor at such elevated temperatures, particularly when the substrate is paper.

It has long been recognized that one of the fastest and most positive methods of applying heat for fusing the powder image is direct contact of the resin-based powder with a hot surface, such as a heated roll. But, in most instances as the powder image is tackified by heat, part of the image carried by the support material will stick to the surface of the plate or roll so that as the next sheet is advanced on the heated roll, the tackified image, partially removed from the first sheet, will partly transfer to the next sheet and at the same time part of the tackified image from said next sheet would adhere to the heated roll. This process is commonly referred to in the art as "offset", a term now well-known in the art.

The offset of toner onto the heated surface led to the development of improved methods and apparatus for fusing the toner image. These improvements comprised fusing toner images by forwarding the sheet or web of substrate material bearing the image between two rolls at least one of which was heated, the rolls contacting the image being provided with a thin coating of tetrafluoroethylene resin and a silicone oil film to prevent toner offset. The outer surfaces of such rolls have also been fabricated of fluorinated ethylene/propylene or silicone elastomers coated with silicone oil as well as silicone elastomers containing low surface energy fillers such as fluorinated organic polymers, and the like. The tendency of these rolls to pick up the toner generally requires some type of release fluid continuously applied through the surface of the roll to prevent such offset, and commonly known silicone oils, are generally well adapted for this purpose. However, the constant application of the fluid requires a separate fluid reservoir and fluid applying means as well as a metering and control system to maintain the proper amount of fluid on the roll. This requires additional equipment and greater expense in maintaining a supply of fluid. Surfaces without a release fluid are generally inadequate to prevent offset especially when used in high speed xerographic reproduction. It is, therefore, the principal object of this invention to provide a fusing surface and method for rapidly fixing resinous powder images without causing offset.

Another object of the present invention is to provide a silicone rubber fuser surface which makes physical contact with the resinous powder image on the substrate, and which, without the use of a release fluid applicator, provides a layer of release material on the surface of the silicone rubber, thereby preventing offset images thereon.

A further object of this invention is to provide a method of fusing wherein a substrate bearing a resin-based powder image contacts a silicone rubber layer at a temperature sufficient to permit the fusion of the resin-based powder to the substrate, wherein the surface of the silicone rubber layer has an adhesion for the fused resin-based powder which is less than the adhesion which the fused resin-based powder has for the substrate, without the external application of silicone oil or other release fluid to the silicone rubber layer.

SUMMARY OF THE INVENTION

These and other objects of the invention are obtained by providing a roll, a flat substrate or other substrate having a suitable shape for fixing resinous powders, comprising a surface of silicone rubber having dispersed therein a catalytic agent which, in the presence of water or moisture, promotes the degradation of the silicone rubber at elevated temperatures. This provides a method of fixing a resin-based powder image to a substrate by contacting the substrate bearing the resin-based powder image with the heated surface of the described silicone rubber layer for a time and at a temperature sufficient to permit the fusion of the resin-based powder to the substrate and permitting the fused resin-based powder on the substrate to cool. The surface of the silicon rubber layer is abhesive to the tackified resin-based powder undergoing fusion on the substrate because the silicone rubber layer has dispersed therein a catalytic agent which, in the presence of water or moisture, degrades the silicone rubber thereby forming a degradation product which is a release material for the tackified resin powder on the heated surface. This degradation product has an adhesion for the fused resin-based powder which is less than the adhesion which the fused resin-based powder has for the substrate, thus, the heated surface of the silicone rubber layer is abhesive to the tackified or heated resin-based powder, and offset is prevented on the heated surface of the silicone rubber layer.

The degradation product (also known as a reversion product) of the silicone rubber resulting from the reaction of the silicone rubber with the water or moisture provides a release material on the surface of the silicone rubber layer. The degradation product of the silicone rubber is a lower molecular weight silicone material having a low surface energy, and it is preferably fluid in nature and resembles silicone oil in properties.

The invention permits the generation of the degradation product of the silicone rubber layer at operating temperatures, that is, at the temperatures which resin-based powder or toner tackifies. The scission process in silicone rubbers is known in the art and is described by Thomas in "Rubber Chemistry and Technology", 40, 629 (1967). Therein, it is disclosed that a peroxide-cured methyl vinyl silicone rubber degrades in the presence of water. In accordance with the present invention, a catalytic agent promotes the degradation of the silicone rubber or elastomer in the presence of water or moisture when it is incorporated within the silicone rubber layer and thereby provides sufficient degradation product of the silicone rubber to form a release layer on the surface of the silicone rubber layer. Thus, by providing a supply of water or moisture either by dispersing agents capable of supplying water or moisture in the silicone rubber layer or by external supply such as a jet of steam, moisture from paper, etc. or combinations thereof, there is provided a method of continuously generating the degradation product to coat the surface of the silicone rubber layer and provide on the surface thereof a layer of degradation product abhesive to the resin-based powder toner throughout the lifetime of the silicone rubber layer.

DESCRIPTION OF THE PREFERRED EMBODIMENTS

In accordance with the present invention, the surface for fixing or fusing a resin-based powder image to a substrate at elevated temperatures may be either a roll, a flat surface, or another type of suitable configuration. However, in accordance with the present invention, the surface must have at least a silicone rubber or elastomer layer having dispersed therein a catalytic agent capable of promoting the degradation of the silicone rubber or elastomer in the presence of water or moisture to form a degradation product which coats the surface exposed to the resin-based powder image. Although the invention is applicable to almost any type of surface which may be used in fixing or fusing a resin-based powder image, for convenience, descriptions set forth herein are directed to fuser roll members which are substantially cylindrical in shape.

The fuser roll members may be constructed entirely of silicone rubber or elastomer, however, in the preferred embodiments herein, the roll structure comprises a hollow cylindrical metal core such as copper, aluminum, steel and the like or coated layers of copper, steel and aluminum and the like, overcoated with the layer of the silicone rubber having dispersed therein a catalytic agent capable of promoting the degradation of the silicone rubber in the presence of water or moisture to degrade the silicone rubber to a degradation product which is abhesive to resin-based powder or toners. As used herein, resin-based powders and toners are used synonymously.

Degradation product herein refers to the product resulting from the degradation of silicone rubber or elastomer in accordance with the present invention when the silicone rubber or elastomer is heated at operating temperatures of the fusing or fixing station, and in the presence of a catalytic agent and water or moisture a product having a lower molecular weight and a more fluid state as well as a lower surface energy than the silicone rubber or elastomer is formed. Preferably, the degradation product is in the nature of an oil. The degradation product forms or accumulates as a layer on the silicone rubber surface. Thus, it is believed that the degradation product is the reaction product of the silicone elastomer or rubber with water in the presence of the catalyst at elevated temperatures, for example, from 200° F. to about 440° F., and that it is a hydrolysis reaction of silicone rubber shown by the formula (crosslinking omitted) set forth below:

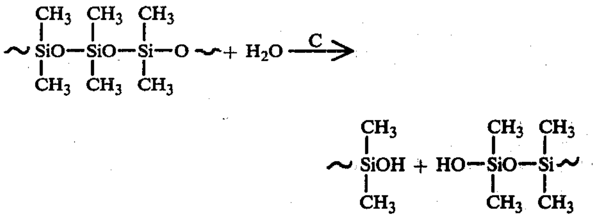

where C represents a catalytic agent which promotes the degradation or reversion of the silicone rubber.

The reaction is believed to take place by the breaking of the polysiloxane backbone chain with the resultant formation of hydroxyl groups where the chain scission occurs. Infra red spectra studies have shown the presence of hydroxyl (—OH) groups after the reaction has occurred.

The surfaces of the fusing devices of the present invention are preferably prepared by applying either in one application or by successively applying to the surface to be coated with the silicone rubber layer a thin coating or coatings of the silicone rubber having therein the catalytic agent capable of degrading the silicone rubber to a fluid degradation product in the presence of water or moisture. When successive applications are made to the surface to be coated, it is generally necessary to heat the film-coated surface to a temperature sufficient to flash off any solvent contained in the film. For example, when a fuser roll is coated with a silicone rubber layer having therein a catalytic agent capable of degrading silicone rubber in the presence of water, the silicone rubber compound having the catalytic agent therein, is successively applied to the roll in thin coatings, and between each application, heating of the film-coated roll is carried out at temperatures of at least about 200° F. or higher so as to flash off most of the solvent contained in the film. When the desired thickness of coating is obtained, the coating is fused to the roll surface. The silicone rubber having therein a catalytic agent capable of degrading the rubber, preferably to a fluid product in the presence of water or moisture, may also be applied as a sleeve to a roll or as a mat to flat or other suitable surfaces. Conventional methods known in the art may be used in providing a surface in accordance with this invention, and the method for coating rollers as taught by Aser et. al. in U.S. Pat. No. 3,435,500 may be used. Another convenient way of forming a fuser roll is by providing an outer layer of the silicone rubber having therein the catalytic agent capable of degrading the rubber in the presence of water wound onto a central core into which core a heating element can be inserted for internally heating the roll.

As discussed above, the catalytic agents of the present invention must be those compounds which will cause or promote the reversion or degradation of the silicone rubber elastomers. This reversion or degradation of the silicone elastomer forms a degradation product which is preferably fluid at operating temperatures. Agents which promote this reaction in the presence of water or moisture, generally believed to be a hydrolysis reaction, are added to the rubber during compounding or during fabrication of the fuser member, and they may be solids, or liquids, or solutions. Many well-known materials may be used in the present invention as catalytic agents to promote the reversion or degradation of the silicone rubber. These processes are generally known in the art. Examples of these materials include potassium hydroxide, sodium hydroxide and other inorganic bases; sulfuric acid, hydrochloric acid, phosphoric acid and other inorganic acids; potassium silanolate; ammonium iodide; acetic acid, propanoic acid, benzoic acid and the like; formamide, quinoline, ethylene diamine, triethylamine, and various other organic acids and bases and the like. Compatible (non-reactive) mixtures of many of the catalytic agents may also be used in accordance with this invention. Other catalytic agents which typically promote the degradation or reversion of the silicone polymers, may be chosen by one skilled in the art. Generally, the most effective preferred catalytic agents are non-volatile, non-toxic, solids (in the amount incorporated in rubber) which do not melt at operating temperatures and which are dispersible in the silicone rubber. However, effective liquid catalytic agents or solids dispersed in liquids may also be dispersed in the silicone rubber in accordance with the present invention.

The amount of catalytic agent (or agents) incorporated (dispersed) in the silicone rubber is an effective amount which is defined herein as the amount required to promote the reversion or degradation of the silicone rubber in the presence of water or moisture at operating temperatures. For example, an effective amount of benzoic acid catalytic agent is greater than about 0.1 percent (by weight based upon the weight of the silicone rubber). A preferred amount of benzoic acid catalytic agent to degrade the silicone rubber in accordance with the present invention is about 1.0 percent by weight. Up to 10 percent by weight of the benzoic acid catalytic agent has been utilized with little or no improvement over the results (elimination of hot offset) obtained with 1.0 percent by weight. Thus, it may be generally stated that about 0.1 percent to at least about 10 percent (by weight) or more of the catalytic agent may be used in accordance with the present invention.

The water or moisture necessary for the degradation or reversion reaction with the silicone rubber may be provided from any suitable source including moisture-containing paper or any other substrate to be fused, an agent capable of supplying water or moisture dispersed in the silicone rubber as disclosed in my copending patent application filed herewith, or by means which provide a jet, stream, reservoir or atmosphere and the like of water or moisture, including steam in the area of the coated fuser member as disclosed in my copending patent application filed herewith and incorporated herein by reference.

The catalytic agent capable of promoting the degradation of the silicone rubber in the presence of water or moisture may be dispersed in the silicone rubber layer by mixing the agent with the silicone rubber gum or elastomeric compound preferably prior to application to the fuser surface undergoing the coating with the coating compound of the present invention. The catalytic agent may be dispersed or otherwise incorporated in the silicone rubber compound by conventional methods known to those skilled in the art, as by any suitable means of dissolving, stirring or blending the agent which is generally in the form of a solid material, into the silicone rubber latex or elastomer or gum. After this dispersion is made, the silicone rubber gum having the catalytic agent dispersed therein is then coated upon the roll or any other suitable surface used in making fusing members by any conventional means as described above. The surface of the rubber layer must be positioned so that it will contact the resin-based powder image upon a substrate at elevated temperatures for the purpose of fusing or fixing the powder. In accordance with the present invention at the surface of the silicone rubber layer having therein a catalytic agent capable of promoting the degradation of the rubber in the presence of water or moisture, there will be provided from at least the surface of the silicone rubber layer itself a release material for the prevention of offsetting or sticking of the resin-based powder or toner to the fuser surface as the resin-based powder image or toner image contacts the fuser surface. When agents capable of supplying water or moisture are also dispersed in the rubber, the catalytic agent and the water producing agent may be incorporated simultaneously or separately and by the same or different techniques.

There are many variables which must be taken into consideration in order to provide the most effective fusing operation, and these include such variables as hardness of the fusing surface, thermal conductivity, pressure, roll or contact speed, heat input, and the like. The selection and balancing of these variables is well-known in the art and may effect the selection of the particular silicone rubber which is to be utilized for the particular fixing surface and the incorporation of the agent capable of supplying water or moisture dispersed therein. Although the thickness of the silicone rubber layer having an agent capable of supplying water or moisture therein may vary with different specific applications of fusing, and particularly of pressure fusing at elevated temperatures, it is generally preferred that the thickness of the silicone rubber having an agent capable of supplying water therein be at least about 0.5 mil. More preferred embodiments however, comprise silicone rubber layers which are about 4 to about 10 mils in thickness in order to provide surfaces which are deformable. However, where deformable or compressible surfaces are not required, and the lack of compressibility is not critical, the thickness of the silicone elastomer may be lower than 4 mils, or alternatively, the thickness of the silicone elastomer may be lower than 4.0 mils when a compressible surface is desired, and there is an undercoating to provide the desired compressibility.

Any type of silicone rubber, gum or elastomer or derivative thereof which is capable of undergoing degradation in the presence of water or moisture may be suitable in the practice of the present invention, especially silicone rubbers which undergo degradation at temperatures used in the fusing operation, for example, about 200° F. to about 400° F. Thus, the silicone rubbers must be water- or moisture-degradable at these temperatures or at any other suitable operating temperature. Satisfactory silicone rubbers include vulcanized polymethylvinyl siloxane, for example, the Dow Corning 400 series of silicone rubbers, polymethylphenyl siloxane, poly-dialkyl siloxane, fluorinated siloxane rubbers or gums, silicone rubber copolymers such as those having block, random, or graft configuration and the like. Vinyl dimethyl polysiloxane, vinyl phenyl polysiloxane, and methyl trifluoropropyl and vinyl dimethyl-polysiloxanes are also examples of silicone elastomers or rubbers which can be used in accordance with the present invention and which degrade to form lower molecular weight fluids upon the hydrolysis reaction in the presence of moisture or water. The only limiting factor in the type of silicone elastomer, gum or rubber which may be utilized in accordance with the present invention, is that it must be capable of forming a degradation product in the presence of water or moisture at elevated temperatures, the degradation product being capable of acting as a release material for tackified resin-based powder or toner placed thereon. The catalytic agent present in the rubber promotes the degradation or reversion of the silicone rubber.

The type of fillers which may be compounded or blended with the silicone rubbers, elastomers or gums are significant in the practice of the present invention. Conventional compositions of silicone elastomers formulated with fillers such as silica, titanium oxide and iron oxide have very short copy life in general. For example, a silicone elastomer fuser blanket having 20 weight percent silica will permit the fixing of only about 1,000 copies before offset occurs and the silicone coat becomes useless. Silicone elastomers having substantially no reinforcing fillers such as silica, used under the same conditions will fix substantially more than 1,000 copies before failure occurs from a mechanical breakdown of the elastomer. In accordance with the present invention, however, it has been discovered that with fillers or catalytic agents which are capable of promoting the degradation of silicone rubbers in the presence of water or moisture substantially improved copy life of the silicone elastomer fusing blanket is possible.

These catalytic agents capable of promoting the degradation or reversion of the silicone rubber in the presence of moisture or water at elevated temperatures, for example, about 200° F. to about 440° F., will result in the thermal degradation of the silicone rubber to produce the degradation product which acts as a release agent for the tackified resin-based powder or toner on the surface of the silicone rubber.

The catalytic agents of this invention may be used in conjunction with other agents or fillers which act as an absorbent or reservoir for water and/or which decompose to form water at elevated temperatures and/or pressure, and which release the water to the silicone rubber in which they are dispersed, at elevated or operating temperatures of the system. As disclosed in my copending patent application, the release of water or moisture from the filler or agent at elevated temperatures preferably takes place at a rate which will extend over a period of time and thereby increase the release life of the roll or other suitable fixing surface. The fillers which act as an absorbent or reservoir for water or moisture and which release the moisture or water at the elevated temperatures during the operation of the system include such materials as colloidal silica particles, hydrated minerals, hydrated silicon dioxide, starch, clays and the like.

Still another effective source of moisture or water which may be dispersed within the silicone rubber of the fuser member, is water-containing capsules which rupture at the elevated temperatures and/or pressure to release water from its encapsulation into the silicone rubber or gum material, to provide the necessary water for hydrolysis and the resulting degradation of the silicone rubber in the presence of the catalytic agents of this invention to degradation products suitable for coating the fusing surface as a release material for tackified resin-based powders. Examples of the capsules of water which may be used in accordance with the present invention, are any forms of encapsulation which retain water until the capsule can be dispersed in the silicone rubber or gum by blending or mixing. One skilled in the art can determine those forms of encapsulation which will retain the water for this particular purpose.

Another effective source of moisture or water which may be dispersed within the silicone rubber of the fuser member, is at least two reactants, a reaction product of which is water. Thus, when these ingredients are incorporated in the silicone rubber, and pressure and/or elevated temperatures initiate the reaction, water is produced within the silicone rubber. The pressure would be provided by the nip pressure when a back-up pressure roll is used to form a nip or to apply pressure to the surface of the silicone rubber layer.

The moisture or water, regardless of the technique used to supply it to the silicone rubber, must be present in an amount which provides sufficient water to cause the degradation of the silicone rubber and the formation of the silicone rubber degradation product in the presence of the catalytic agent. When the water-forming agent is incorporated in the water degradable silicone rubber, it generally comprises at least about 0.05 percent by weight based upon the weight of the silicone rubber. Preferably, the agent or filler or capsule capable of supplying water is present in a dispersed form in a silicone gum or rubber as finely divided particles of about 1 to about 2.5 microns in size and in an amount comprising about 1.0 to about 5.0 percent by weight based upon the weight of the silicone rubber or gum. Sources of water or moisture may also be natural or deliberate moisture in the paper or natural or deliberate water or moisture in the vicinity of the fusing device. By natural moisture is meant atmospheric moisture. Deliberate water or moisture is water provided by external sources, e.g., steam, reservoir of water, humidity chamber, and the like.

Although the invention has been described mainly in terms of silicone rubber layers or coatings upon rolls which are conductive to heat, the present invention is not limited to such a configuration, and preferred embodiments of the invention also encompass flat silicone rubber surfaces, concave or convex surfaces of silicone rubber and all other configurations which may be used in fusing operations and devices. Furthermore, the present invention may be directed to any surface which requires a silicone rubber layer having a release layer thereon, and is not necessarily directed to fuser rolls or fuser surfaces.

The invention is also directed to a process for providing or continuously generating a release agent on the surface of a silicone rubber fuser member which comprises providing a silicone rubber material capable of forming a degradation or reversion product or depolymerizing in the presence of moisture or water at elevated temperatures, providing a source of water in or at the surface of the silicone rubber layer and heating the silicone rubber layer at a temperature which causes the formation of a degradation product which coats the silicone rubber layer, thereby providing a release material on the surface. This release material is preferably a silicone fluid.

By use of the term "dispersed therein" in accordance with the present invention, is meant any manner of distribution of the agent in the silicone rubber including a solid or liquid dispersed throughout the rubber or a solid or liquid dissolved in the rubber. The terms water and moisture as used herein are interchangeable and include steam.

Having described the basic composition and process of the present invention and the preferred method by which the composition and process may be used, illustration will now be made of the novel silicone rubber material and the use of the materials representative of those in the present invention.

EXAMPLE I

Into polymethylvinyl siloxane containing about 0.57 mole percent of vinyl groups, provided by Dow Corning Corporation, was dispersed 1.0 weight percent of a catalytic agent, benzoic acid, dissolved in toluene. The dissolved benzoic acid was incorporated into the silicone rubber by conventional blending techniques. The silicone gum or rubber having the benzoic acid catalytic agent therein was metered upon the surface of an internally heated copper roll so that the coat was about 10 mils in thickness. The coat was then cured for one-half hour at 300° F., in the presence of conventional curing agents incorporated in the silicone gum.

The silicone rubber coated roll fabricated on a copper tube having a 3.5 inch outside diameter was used in a test operation in combination with a pressure roll formed from silicone rubber secured on a one-half inch steel shaft. Heat was supplied to this system by means of a 750 watt quartz lamp disposed within the core of the copper tube of the fuser roll. The tube rotated around the lamp at a roll surface speed at a rate of 20 inches per second, and the lamp heated the surface of the silicone rubber layer at 300° F. The pressure formed and maintained at the nip of the pressure roll and the fuser roll was approximately 21 pounds per lineal inch was maintained. Moisture was present in the atmosphere and in the paper. Toned electrostatic images on the standard $8\frac{1}{2} \times 11$ inch paper were fed through the nip formed by the rolls. Over 80,000 of these images were fused in the test using the resin-based powder or toner on the heated fuser roll. Thus, a large number of resin-based powder images were fused with a single fuser roll made in accordance with the present invention without the necessity of applying any release fluid to the operation as the fusing continued.

EXAMPLE II

The procedure of Example I was followed except the copper fuser roll was coated with a polymethylvinyl siloxane having 1.0 weight percent benzoic acid and 8.0 parts per hundred (based upon the siloxane) colloidal silica (an agent capable of supplying water) supplied by Cabot Corporation under the trade designation S-17. Over 70,000 copies having toned electrostatic images thereon were fused without offset in a test using conventional resin-based powder or toner.

EXAMPLE III

The procedure of Example II was followed except 3.0 parts per hundred (based upon the siloxane) of the identical colloidal silica (an agent capable of supplying water) was used with 1.0 weight percent benzoic acid catalytic agent. Up to 200,000 copies having toned electrostatic images thereon were fused without offset in a test using conventional resin-based powder or toner as in Example I.

The reason for the outstanding performance of the silicone rubber layer having dispersed therein a catalytic agent capable of promoting the degradation or reversion of the silicone rubber in the presence of water or moisture, is believed to be due to the hydrolysis of the silicone rubber material and the resulting formation of a degradation product in the presence of water and a catalytic agent and in certain instances in the presence of a water-supplying agent and a catalytic agent, which provides a release material on the surface of the silicone rubber thereby operating as a release material and preventing offsetting. Furthermore, the filler material increases the life of the silicone rubber layer on the fuser surface, and the thermal characteristics of the roll are not impaired.

It is to be understood that the above description is for the purpose of illustration only, and that the invention includes all modifications falling within the scope of the appended claims.

What is claimed is:

1. An article for use in a xerographic reproducing apparatus for fixing a resin-based powder image to a substrate at elevated temperatures, comprising a fuser member having a surface of silicone rubber having substantially no reinforcing filler and being capable of forming a degradation product in the presence of water at elevated temperatures, said silicone rubber having a catalytic agent therein in an amount which in the presence of water or moisture, promotes the degradation of the silicone rubber and the formation of a degradation product on the surface, said degradation product acting as a release material and having an adhesion for the resin-based powder which is less than the adhesion which fused resin-based powder has for the substrate.

2. The article of claim 1 wherein the silicone rubber having the catalytic agent therein is at least 0.5 mil in thickness.

3. The article of claim 1 wherein the silicone rubber having the catalytic agent therein is about 6 to about 10 mils in thickness.

4. The article of claim 1 wherein the catalytic agent is an inorganic acid which promotes the degradation of the silicone rubber.

5. The article of claim 1 wherein the catalytic agent is an inorganic base which promotes the degradation of the silicone rubber.

6. The article of claim 1 wherein the catalytic agent is an organic acid which promotes the degradation of the silicone rubber.

7. The article of claim 1 wherein the catalytic agent is an organic base which promotes the degradation of the silicone rubber.

8. The article of claim 1 further comprising an agent capable of supplying water incorporated therein.

9. The article of claim 8 wherein the agent capable of supplying water is at least 0.05 percent by weight based upon the silicone rubber.

10. The article of claim 8 wherein the agent capable of supplying water is preferably about 1.0 to about 5.0 percent by weight based upon the silicone rubber.

11. The article of claim 1 wherein the catalytic agent is present in an amount greater than about 0.1 weight percent.

12. The article of claim 1 wherein the catalytic agent is present in an amount of about 1.0 to about 10 weight percent.

13. The article of claim 1 wherein the silicone rubber is a polymethyl phenyl siloxane.

14. The article of claim 1 wherein the silicone rubber is a polydialkyl siloxane.

15. The article of claim 14 wherein the silicone rubber is fluorinated.

16. The article of claim 1 wherein the silicone rubber is polymethylvinyl siloxane.

17. The article of claim 1 comprising a fuser roll member.

* * * * *